HARRY M. RADIN
LEONARD F. BECKHAM
WILLIAM C. BECKHAM
INVENTORS

HUEBNER, BEEHLER,
WORREL & HERZIG
ATTORNEYS

May 24, 1955  H. M. RADIN ET AL  2,709,011
TRACTOR MOUNTED LOADING APPARATUS
Filed Aug. 17, 1951  3 Sheets-Sheet 3
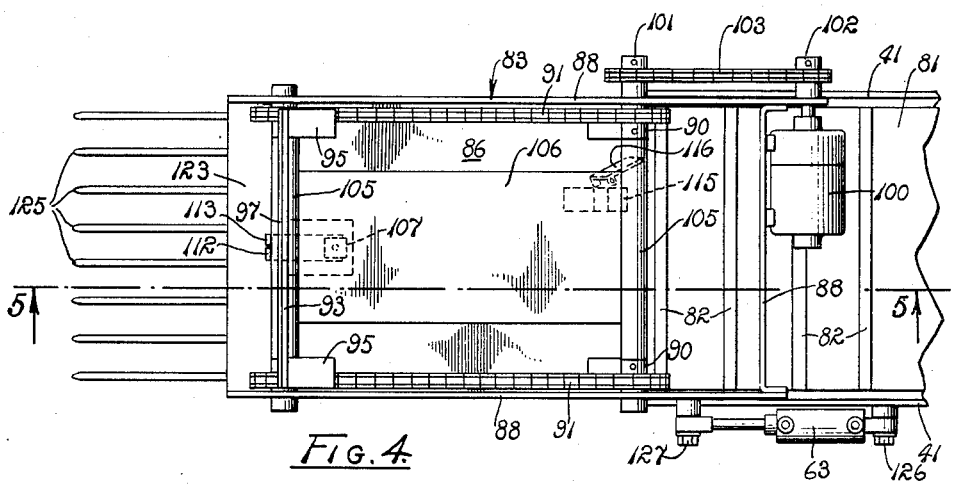
Fig. 4.
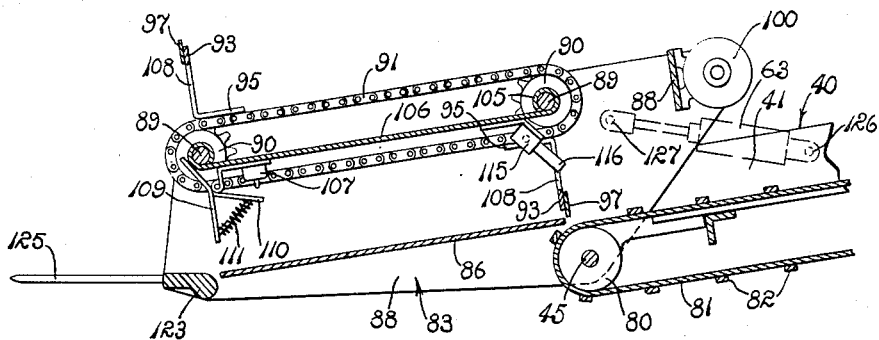
Fig. 5.
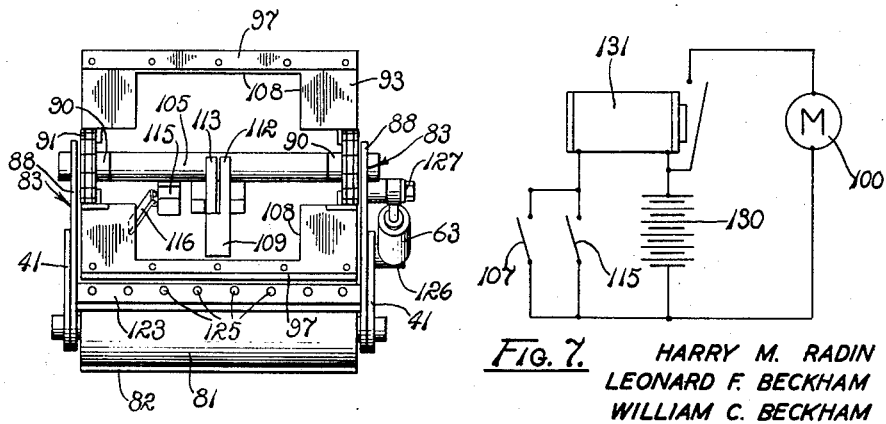
Fig. 6.
Fig. 7.
HARRY M. RADIN
LEONARD F. BECKHAM
WILLIAM C. BECKHAM
INVENTORS
HUEBNER, BEEHLER, WORREL & HERZIG
ATTORNEYS
BY Richard M. Worrel United States Patent Office 2,709,011
Patented May 24, 1955

2,709,011

TRACTOR MOUNTED LOADING APPARATUS

Harry M. Radin and Leonard F. Beckham, Fresno, and William C. Beckham, Fowler, Calif.

Application August 17, 1951, Serial No. 242,326

3 Claims. (Cl. 214—91)

The present invention relates to loading apparatus and more particularly to an apparatus for gathering ground supported containers of agricultural produce and elevating the containers onto a transporting device.

A substantial portion of the cost to the consumer of perishable farm produce such as fruits and vegetables results from the extensive hand labor required to harvest such produce, gather it from the field, pack it and convey it to market. For example, fresh peaches, apricots, plums, cherries, figs, mangoes, and the like are picked by hand and placed in field boxes by picking crews. The boxes are subsequently gathered on wagons or trucks and transported to a packing shed for sorting, grading, packing and conveyance to market. In the production of raisins it is the usual practice for picking crews to sever bunches of grapes from vines and to place the bunches on paper trays for exposure to the sun. After the grapes have partially dried they are turned so that the opposite sides of the bunches may also be exposed to the sun. Subsequent to the drying, the trays are rolled into relatively tight bundles for curing and in which condition they are gathered onto wagons or trucks and transported from the vineyard.

Although the actual harvesting of such fruits is essentially a hand operation, it has been discovered that the boxes containing fruit, the rolled trays of raisins, and other containers of agricultural produce can be gathered and transported from the field by mechanical means obviating excessive hand labor and expenses incident thereto.

An object of the present invention is to provide mechanical means for gathering ground supported containers of agricultural produce for conveyance to a packing shed, processing plant, or other destination.

Another object is to provide an apparatus adapted for mounting on a tractor or other earth traversing vehicle suited to the gathering of ground supported boxes, rolled trays, and the like containing agricultural produce and the automatic elevating of such containers for convenient loading onto an earth traversing vehicle such as a wagon or vineyard truck.

Another object is to provide in a loading apparatus a pivotally mounted inclined conveyor having pick-up fingers endwardly extended therefrom for pivotal elevational movement.

Another object is to provide in a loading apparatus of the character described cooperative conveying means articulately interconnected and means for independently pivotally positioning the portions of the conveying means so as to facilitate gathering operations and to control the inclination of articles and their path of travel elevationally conveyed thereby.

Further objects and advantages are to provide improved elements and arrangement thereof in a device of the character and for the purposes set forth that is durable, economically constructed, and expeditiously mounted on and removed from a supporting vehicle.

In the drawings:

Fig. 4 is a fragmentary plan view of a second form of the present invention.

Fig. 5 is a longitudinal vertical section of the portion of the second form of the present invention, as viewed from line 5—5 in Fig. 4.

Fig. 6 is an end elevation of the structure shown in Fig. 5.

Fig. 7 is a schematic electrical diagram employed in the second form of the invention.

Fig. 8 is a schematic diagram of a hydraulic control system utilized in both forms of the loading apparatus.

Figure 1:
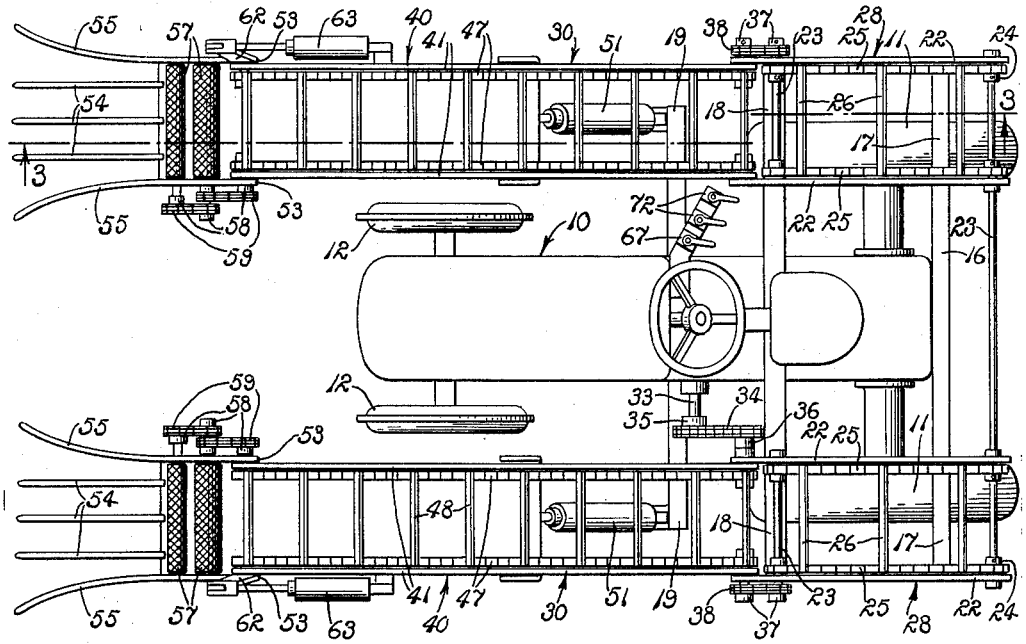
Fig. 1 is a plan view of a tractor exemplifying earth traversing vehicles generally having mounted thereon a loading apparatus of the present invention.
Figure 2:
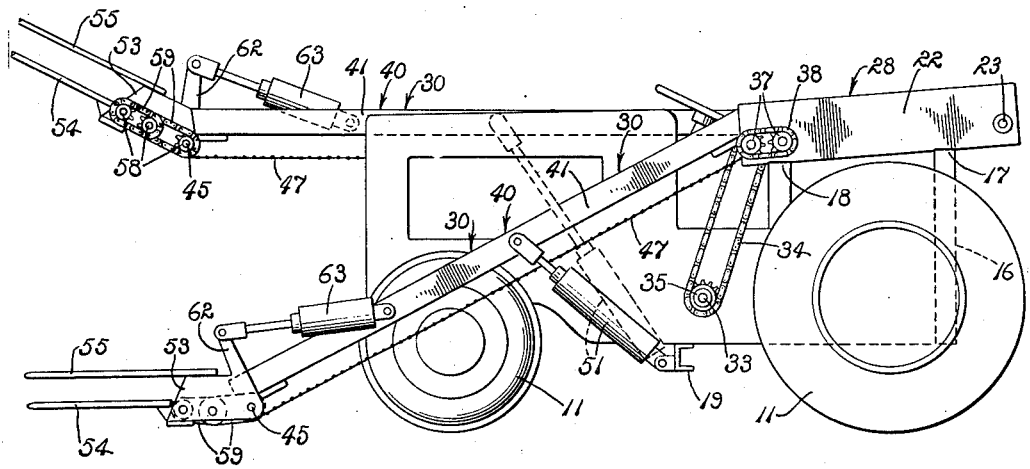
Fig. 2 is a side elevation of the tractor and loading apparatus shown in Fig. 1.

Referring in greater detail to the drawings:

In Figs. 1 and 2 a tractor is indicated generally at 10 illustrative of automotive vehicles generally suitable for mounting the instant loading apparatus for earth traversing movement. The tractor is supported in the usual manner on a pair of rear driven wheels 11 and a pair of forward steerable wheels 12. The tractor also provides a cowling 13 and a transmission 14 identified for purposes of describing the mounting of the subject invention thereon.

The loading apparatus may be mounted on the tractor 10 in any convenient manner but preferably such as to provide expeditious mounting and removal so that use of the tractor for other purposes is not unduly restricted. A great many forms of mountings will occur to any person skilled in the art, the form shown in Figs. 1 and 2 being shown merely for exemplary purposes.

A pair of rigid supports 16 are bolted or otherwise secured to the transmission 14 in upwardly extended attitudes. A transverse angle iron member 17 is weldably or otherwise secured to the upwardly extended ends of the supports 16 transversely of the normal direction of movement of the tractor. A forward angle iron member 18 is bolted in a substantially horizontal attitude on the tractor in substantially parallel relation to the angle iron member 17. For purposes of control, a beam 19 is bolted transversely beneath the tractor.

Pairs of elongated side plates 22 are mounted in substantially parallel relation on the angle iron members 17 and 18 at opposite sides of the tractor and in substantial alignment with the normal direction of travel thereof. A pair of horizontally spaced shafts 23 are journaled transversely in each pair of side plates 22. Each shaft mounts a pair of conveyor sprockets 24 in axially spaced relation, corresponding sprockets of each pair of shafts 23 being in alignment. A continuous chain 25 is mounted in circumscribing relation on each pair of aligned sprockets and the chains between each pair of side plates 22 interconnected by rigid cross members 26 preferably providing outwardly disposed serrated edges 27. It will be apparent that the rotation of the shafts 23 results in the travel of the chains 25 and cross members 26, hereinafter referred to as the delivery conveyors 28. The delivery conveyors are preferably interconnected for corresponding travel by providing that a pair of corresponding, aligned shafts 23 at opposite sides of the tractor 10 be of unitary construction. Elongated ledges 29 are inwardly extended from each of the side plates 22 and provide longitudinal supports for upper runs of the chains 25 intermediate the sprockets 24.

The side plates 22 provide convenient mountings for a pair of elevating conveyors 30 by being extended forwardly from the forwardmost shaft 23, as at 31. Drive shafts 32 are rotatably mounted in the forward extensions 31 transversely of the tractor 10. A conventional tractor power take-off is indicated at 33 which is connected in driving relation to one of the drive shafts 32 by a chain 34 mounted in circumscribing relation to a sprocket 35 of the power take-off and a sprocket 36 mounted on the drive shaft 32.

Figure 3:
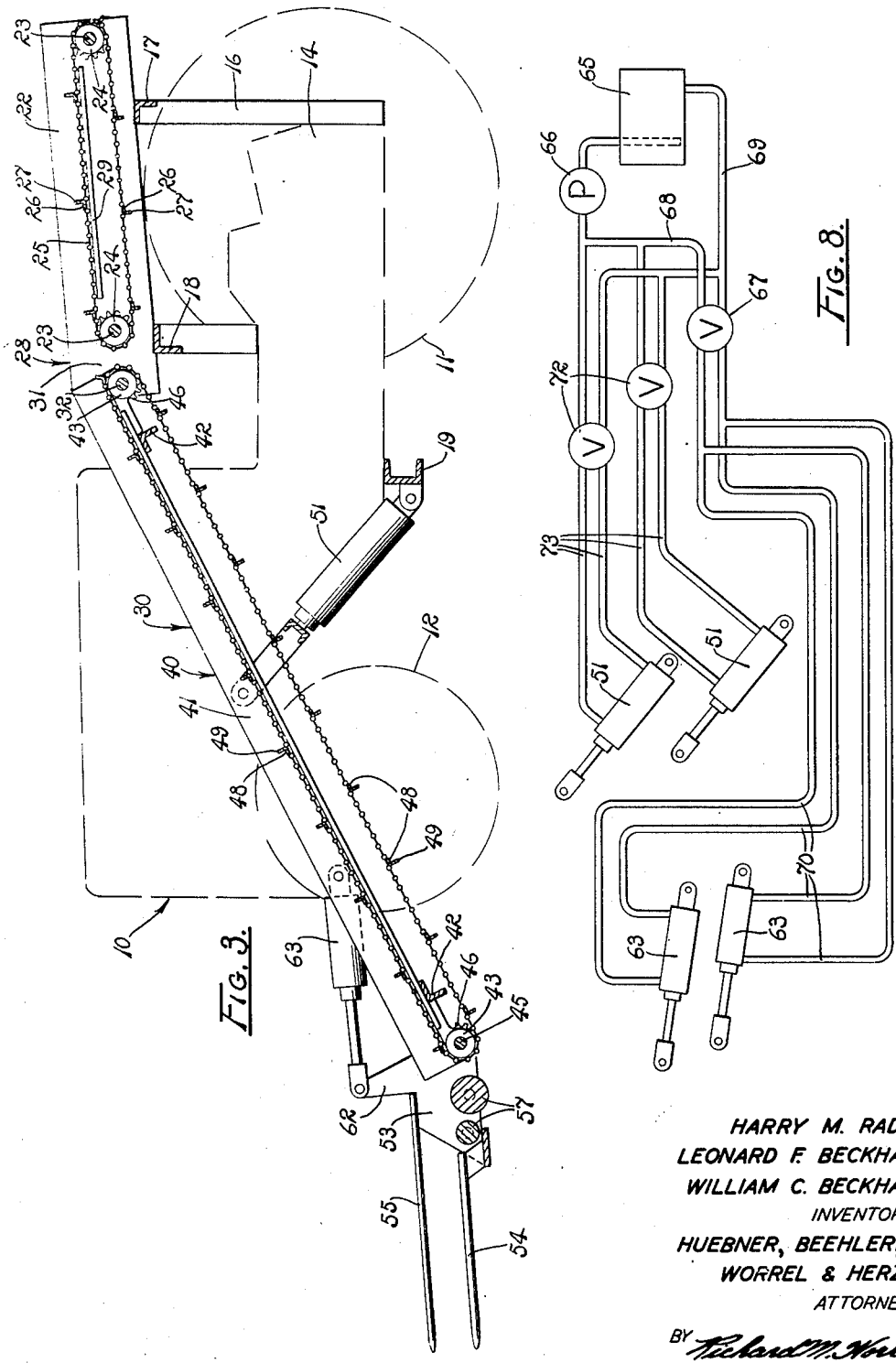
Fig. 3 is a longitudinal section of the loading apparatus taken on line 3—3 of Fig. 1.

Driving interconnection is provided between the drive shafts 32 and the forwardmost of the shafts 23 of the delivery conveyors 28 by mounting coupling sprockets 37 on said shafts and providing a coupling chain 38 in circumscribing relation thereto. It will be evident that as the power take-off 33 drives the chain 34, one of the drive shafts 32 is rotated, in a clockwise direction, as viewed in Fig. 2, the delivery conveyors 28 traveled with upper runs thereof moving rearwardly of the tractor, and the opposite drive shaft 32, best seen in Fig. 3, rotated in the same direction by the coupling action provided by the sprockets 37 and chain 38.

An elongated frame 40 consisting of a pair of elongated angle iron members 41 interconnected in parallel relation by spacers 42 is pivotally mounted on each of the drive shafts 32 and forwardly extended therefrom. The pivotal mounting is conveniently achieved by providing bearings 43 mounted on the angle iron members 41 rotatably embracing the drive shafts 32. The angle iron members 41 are preferably spaced so as to fit between the side plates 22 of the delivery conveyor and so arranged as to define a rearwardly and upwardly inclined conveying channel of a width adapted to receive any predetermined size of picking boxes, not shown, or the like.

An idler shaft 45 is journaled transversely in the forward end portions of the angle iron members 41. Pairs of aligned elevator conveyor sprockets 46 are mounted on the drive shafts 32 and idler shafts 45. Conveyor chains 47, similar to chains 25 are mounted in circumscribing relation on the pairs of sprockets 46 and each provide upper runs rested on the angle iron members 41. The chains 47 are interconnected by cross members 48 providing outwardly disposed serrated edges 49.

Control rams 51 are pivotally connected between the beam 19 and the frames 40 at positions removed from the pivotal mounting of the respective frames.

A finger mounting bracket 53 is pivotally mounted on each of the idler shafts 45 and forwardly extended therefrom. A plurality of rigid pick-up fingers 54 are mounted on each of the brackets 53 and forwardly extended therefrom in laterally spaced relation to permit encountered earth, debris and the like to pass therebetween. Guide fingers 55 are also mounted in the brackets 53 and forwardly extended therefrom in arcuately divergent relation at an elevation appreciably above the pick-up fingers.

Forward movement of the loading apparatus of the present invention permits the insertion of the fingers 54 under boxes and the like and their movement upwardly onto the fingers. To convey such articles from the fingers onto the elevating conveyors 30, any desired number of feed rollers 57 are rotatably mounted in the brackets 53 intermediate the fingers 54 and the forward ends of the conveyors 30. The feed rollers preferably are provided with a treaded peripheral surface of rubber, plastic, or other material having a high coefficient of friction or provided with teeth or the like, not shown, facilitating driving engagement with articles passed thereto by the fingers 54. Sprockets 58 are mounted concentrically on the feed rollers 57 exteriorly of the brackets 53 and on the idler shafts 45 exteriorly of the angle iron members 41 and coupling chains 59 mounted in circumscribing relation thereto whereby driven connection is established between the feed rollers and their adjacent sprockets on the idler shafts. It will be observed that the mounting of the brackets 53 by pivotal movement concentric to the idler shafts 45 permits pivotal elevational movement of the brackets and their fingers without interference with the driven rotation of the feed rollers.

A control arm 62 is rigidly upwardly extended from each of the brackets 53. A control ram 63 is pivotally connected between the upper end of each of the arms 62 and their respectively adjacent frame 40.

Tractors of the type shown at 10 usually provide reservoirs 65 for hydraulic control fluid to which a driven pump 66 is connected. A preferred form of control system is shown in Fig. 8. A control valve 67 is supported by the cowling of the tractor and is connected to the pump 66 by means of a pressure conduit 68 and to the reservoir 65 by a bleeding conduit 69. Control conduits 70 interconnect the valve 67 and opposite ends of the rams 63. The valve 67 is of a well-known type providing a central portion blocking fluid flow to and from the control conduits 70 and positionable to direct hydraulic fluid under pressure from the pump 66 to corresponding ends of the rams 63 while bleeding the opposite ends thereof back to the reservoir. It will be apparent that a pair of valves may be employed in place of the valve 67 to provide individual pivotal control of the brackets 53 and their respective fingers but such independent control has not been found necessary in usual operations because the device is normally utilized at one side of the tractor at a time to gather a single row of boxes or other containers while the conveyor 30 at the opposite side of the tractor is elevated to inoperable position.

A pair of conveyor control valves 72 are also supported by the cowling and are connected to the pressure conduit 68 and individually connected to opposite ends of the rams 51 by conveyor control conduits 73. The valve 72 like the valve 67 provides a central position blocking fluid flow therethrough and both are operable independently to supply fluid under pressure to selected ends of their respective rams 51 for the controlled extension or contraction thereof.

*Operation*

Although the utility of the present invention is believed apparent, its operation is briefly summarized at this point. As previously indicated, the loading apparatus is usually employed to gather a plurality of boxes or other containers rested on the ground in a single row. In this event, the valves 72 are operated so that one of the elevating conveyors 30 is elevated to inoperable position, as shown in Fig. 2, and the other thereof lowered to operable position with the forwardly extended ends of the angle iron members 41 in spaced adjacent relation to the surface of the ground. The rams 51 are preferably so adjusted that when fully contracted the forward ends of the angle iron members closely approach the surface of the ground but do not descend enough to dig into the earth.

The tractor 10 is driven endwardly of a row of boxes or other containers, not shown, with the conveyor 30 in operable position aligned with the boxes. The valve 72 controlling the bracket 53 borne by the conveyor 28 pivoted to operable position is operated so that the pick-up fingers 54 slide under encountered boxes and usually extend below the surface of the ground. The forward movement of the tractor causes such boxes to slide rearwardly on the fingers and to be guided onto the feed rollers 57 by the guide fingers 55. When a box or the like does not slide rearwardly of the fingers a distance sufficient to pass onto the feed rollers, the sliding action may be assured by manipulating the appropriate valve 72 to pivot the fingers 54 slightly downwardly concurrently with manipulation of the valve 67 slightly to raise the forward end portion of the conveyor 28 being employed. This results in the sliding of the box or the like into the ground to a depth sufficient to preclude further slidable movement in the direction of tractor travel at which time the fingers pass under the box and elevate the same. Rearward movement of the box onto the feed rollers is further facilitated by quickly pivoting the fingers upwardly by contracting rams 63 so as to give the box a rearward push onto the rollers.

Frictional engagement of the feed rollers 57 with the bottoms of boxes scooped up by the fingers 54 dependably delivers the boxes rearwardly onto the forward end portion of the conveyor 30 between the angle iron members 41. Such boxes rest on the serrated edges 49 of the cross members 48 and are carried thereby upwardly of the conveyor for discharge onto the delivery conveyor 28 aligned therewith.

As evident in Figs. 1 and 2, one of the feed rollers 57 is adjacent to the fingers 54 and the other adjacent to the conveyor. The roller adjacent to the fingers is substantially smaller in diameter than the relatively rearward roller. This has been found to facilitate positioning of the fingers 54, and roller adjacent thereto, beneath boxes to be elevated. Even more significantly, it is found advantageous to accelerate rearward movement of boxes lifted by fingers 54 as they pass from the fingers to the conveyor. The sprockets 58 are of substantially the same size and thus their respective rollers are rotatable at the same rotational speed but inasmuch as the rearward roller is substantially larger than the forward roller, the peripheral speed of the rearward roller is appreciably greater. When a box passes upwardly on the fingers 54 to the forwardmost of the rollers, it is given a rearward impetus thereby. This rearward impetus is subsequently increased and an accelerated movement achieved by engagement of the box with the rearward roller having the greater peripheral speed. The accelerated movement has been found desirable in more dependably directing the boxes onto the conveyor for elevational movement by the crossmembers 48 and in obviating objectionable lodging of the boxes at the transition from the fingers to the conveyor.

It is the usual practice to employ a vineyard truck (not shown) or other vehicle towed by the tractor 10 on which an attendant is carried. The delivery conveyor 28 successively delivers boxes rearwardly of the tractor where they are successively grasped by the attendant and stacked on the vehicle or emptied into containers carried thereby, such as the dump tanks shown and described in our co-pending patent application (entitled "Dump Tank Attachment for Industrial Trucks" executed July 13, 1951, and concurrently transmitted herewith for filing) and the empty boxes returned to the field for re-use.

Obviously the valves 72 may be manipulated to bring both of the elevating conveyors 30 into operable position at the same time. For such operation, however, it is necessary for the boxes or other containers to be prearranged in parallel lines spaced the same distance as the elevating conveyors 30 on the tractor. For dual operation, it is sometimes desirable to employ a pair of valves 67 so that the brackets 53 can be individually controlled as necessitated by encountered boxes.

The loading apparatus described is excellently suited to the gathering of picking boxes, lug boxes, and other containers and their conveyance to an elevated position for convenient delivery rearwardly of the tractor 10. The gathering of rolled trays of raisins, not shown, however, presents a somewhat different gathering problem for which a second form of the present invention shown in Figs. 4 to 7 has been devised.

Second form

To adapt the delivery conveyors 28 and elevating conveyors 30 for the handling of rolled paper trays containing raisins, the sprockets 24 and 46 of the first form of the invention are removed from their respective shafts 23, 36 and 45 and cylindrical drums 80 mounted concentrically on the shafts. The delivery and elevating conveyor chains are supplanted by endless belts 81 preferably providing treaded surfaces 82.

The brackets 53 are removed from the idler shafts 45 and rigid extensions 83 pivotally mounted on the shafts 45 and forwardly extended therefrom.

A slide 86 of sheet metal or the like is mounted on each of the extensions 83 and is rearwardly inclined so that the rearward end portion thereof is in tangential proximity to the adjacent drum 80.

The extensions 83 provide substantially parallel vertical walls 88 in substantial alignment with the angle members 41. A pair of axles 89 are journaled in the walls 88 transversely of each extension 83 in vertically spaced relation to opposite ends of the slide 86. A pair of axially spaced pusher sprockets 90 are mounted on each of the axles 89 so as to provide corresponding sprockets on each axle in alignment longitudinally of their respective slides. A pusher chain 91 is mounted in circumscribing relation on each of the pairs of aligned sprockets. A pair of pusher plates 93 transversely interconnect each pair of chains and are outwardly extended therefrom. Each pusher plate has an arm 95 rigidly extended therefrom overlaying a portion of each chain rearwardly of the direction of movement of the chains. The arms 95 engage their respective chains and constrain the pusher plates 93 to outwardly extended positions and yet accommodate travel about the sprockets 90. It has been found advantageous to affix elongated strips 97 of canvas or other fabric along the marginal edges of the pusher plates 93 constituting sweeps.

An electric motor 100 is mounted on a wall 88 adjacent to each of the frames 40. A driving sprocket 101 is mounted on the shaft 89 adjacent to the motor 100 in alignment with a sprocket 102 provided by the motor and driven interconnection of the sprockets effected by a chain 103 in circumscribing relation thereto.

A sleeve 105 is rotatably mounted in circumscribing relation on each of the axles 89 between the sprockets 90. A stay 106 interconnects the sleeves of each pair of shafts and provides a convenient switch mounting.

A normally open electric starting switch 107 is mounted on the stays 106 adjacent to the forwardmost shafts 89. As shown in Fig. 6, each of the pusher plates are centrally apertured at 108 to pass the switches without engagement therewith. A switch control lever 109 is pivotally mounted on the stay in dependent relation thereon. An auxiliary lever 110 is pivotally mounted concentrically of the pivotal mounting of the lever 109. A cushioning spring 111 interconnects the levers 109 and 110. As viewed in Fig. 5, the levers 109 and 110 are provided with individual extensions 112 and 113 respectively engageable with the adjacent sleeve 105 to limit gravitational counterclockwise rotational movement thereof. The lever 109 is limited in counterclockwise movement into downwardly extended position shown and the auxiliary lever 110 is limited to counterclockwise movement to a position disengaged from the switch 107 but adjacent thereto.

A normally closed stop switch 115 is mounted on each of the stays 106 adjacent to the rearwardmost sleeves 105. The stop switches provide downwardly extending operating levers 116 engageable with pusher plates 93 passed thereunder to open the switch.

A finger mounting bracket 123 is rigidly mounted in the forward end portion of each of the extensions 83. A plurality of pick-up fingers 125 similar to the fingers 54 are rigidly mounted in each bracket and forwardly extended therefrom.

The control rams 63 are pivotally mounted on the frames 40, as at 126, as previously described, and pivotally connected to a portion of the extension 83, as at 127. The rams are hydraulically connected as before. The pivotal inclination of the fingers 125 and extensions is controlled by manipulation of the valve 67, as described for the fingers 54 and the elevating conveyors controlled as to inclination by manipulation of the valves 72.

As shown in Fig. 7, the motor 100 is energized from a battery 130 on the tractor 10 or other suitable source of electrical energy. A relay 131 has a circuit breaking portion thereof wired in series with the motor and the battery. The starting switch 107 and the step switch 115 are electrically connected in parallel in series with a primary of the relay and with the battery.

To pick up rolled paper trays and the like, the tractor 10 is driven as before with one of the elevating conveyors aligned with a row of the trays rested on the ground. The appropriate conveyor 30 and slide 86 is moved to operable position and the opposite conveyor and slide raised to inoperable position by manipulation of rams 51. The fingers 125 and their respective extensions 83 are angled so as to pass under encountered trays and are subsequently elevated to urge the trays rearwardly onto their respective rearwardly adjacent belt 81, as desired.

A tray delivered to the slide strikes the lever 109 which through the spring 111 moves the auxiliary lever 110 into engagement with the switch 107 closing the same. Closing of the switch 107 energizes the primary of the relay and closes the circuit breaking portion thereof energizing the motor 100 traveling the chains 91 in a counterclockwise direction, as viewed in Fig. 5. This urges the pusher plates 93 upwardly over the slide 86 showing the paper tray initially engaged with the lever 109 upwardly over the slide onto the belt 81 for subsequent conveyance to the rear of the tractor, as previously described. The apertures 108 in the pusher plates permit their travel past the starting switch 107 and the levers 109 and 110 without engagement therewith.

When a pusher plate 93 delivers its tray to the belt 81, it engages the operating lever 116 and opens the stop switch 115. It will be observed, that the levers 109 and 110 pivot gravitationally downwardly when the tray is carried from engagement therewith and thus by the time the stop switch 115 is opened the starting switch 107 in parallel therewith has already been opened thus the relay 131 is deenergized interrupting the circuit to the motor 100 upon delivery of the tray to the conveyor. The normally closed stop switch 115 is held in open position by engagement of its operating lever 116 with the pusher plate, and the normally open starting switch 107 remains open until a successive tray is delivered into engagement with the lever 109 as a result of which the cycle is repeated.

The loading apparatus of the present invention makes possible the substantial reduction of harvest costs for fresh fruits, vegetables and the like. The pivotal movement of the fingers (54 and 125) relative to the elevating conveyors 30, and the pivotal movement of the elevating conveyors relative to the delivery conveyors 28 permit careful engagement, lifting, elevating, and rearward delivery of engaged containers and the like.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. In a loading apparatus for ground supported containers of agricultural produce having an elongated frame, means mounting the frame for pivotal elevational positioning and longitudinal earth traversing movement, sprockets mounted at opposite ends of the frame for rotation about axes transversely of the frame, a chain conveyor mounted in circumscribing relation on the sprockets longitudinally of the frame, means having driven connection with the conveyor circuitously traveling the conveyor in the frame, a bracket pivotally mounted in the frame concentric to the axis of rotation of the sprockets at the corresponding end of the frame and endwardly extended therefrom, a plurality of fingers mounted in the bracket in spaced relation to the conveyor and endwardly extended therefrom, and control means providing independent pivotal positioning of the frame on the mounting means and of the bracket on the frame; the combination of a substantially horizontal first feed roller rotatably mounted in the bracket transversely of the conveyor adjacent to the fingers, a substantially horizontal second feed roller of a diameter substantially greater than the first feed roller rotatably mounted in the bracket between the first feed roller and the conveyor, and a drive linkage interconnecting the conveyor and the feed rollers rotating the feed rollers at substantially the same rotational speed whereby the second feed roller has a greater peripheral speed than the first feed roller.

2. In a loading apparatus for ground supported objects having a frame, means mounting the frame for earth traversing movement in a predetermined direction in relation to the frame, said frame having a forward end portion adjacent to the ground and a rearward end portion in elevationally spaced relation thereto, a conveyor mounted in the frame having an upper run traveled from the forward end portion to the rearward end portion thereof, and a plurality of pick-up fingers borne by the frame in spaced relation to the conveyor and extended therefrom in the direction of earth traversing movement of the frame; the combination of a substantially horizontal first feed roller rotatably mounted on the frame transversely of the conveyor intermediate the fingers and the conveyor, a substantially horizontal second feed roller of a diameter substantially greater than the second feed roller mounted on the frame transversely of the conveyor and between the first feed roller and the conveyor, and means having driving connection to the feed rollers rotating said rollers at substantially the same speed whereby the second feed roller has a peripheral speed greater than that of the first feed roller.

3. In a loading apparatus having a predetermined direction of earth traversing movement, pick-up fingers downwardly and forwardly extended from the apparatus adjacent to the ground for engagement and pick up of articles rested on the ground during earth traversing movement of the apparatus, and a conveyor having a lower end adjacent to the fingers and an opposite end in elevationally spaced relation thereto, the lower end of the conveyor being at a greater height than the fingers adjacent thereto; a device for receiving articles from the fingers and elevating the articles onto the conveyor at an accelerated speed comprising a substantially horizontal first feed roller rotatably mounted in the apparatus adjacent to the fingers between the fingers and the conveyor, said first feed roller having an upper peripheral portion disposed to receive articles from the fingers and a lower peripheral portion adjacent to the ground, a substantially horizontal second feed roller rotatably mounted in the apparatus between the first feed roller and the conveyor, said second feed roller being of a diameter greater than the first feed roller and having a lower peripheral portion adjacent to the ground and an upper peripheral portion at an elevation above the upper peripheral portion of the first feed roller, and means having driven connection to the feed rollers rotating said rollers at substantially the same rotational speed whereby the second feed roller has a greater peripheral speed than the first feed roller.

References Cited in the file of this patent

UNITED STATES PATENTS

| Number | Name | Date |
| --- | --- | --- |
| 770,260 | Cahill | Sept. 20, 1904 |
| 1,299,198 | Low et al. | Apr. 1, 1919 |
| 1,573,728 | Manning | Feb. 16, 1926 |
| 1,642,287 | Zuckerman | Sept. 13, 1927 |
| 1,726,604 | Amen | Sept. 3, 1929 |
| 1,759,072 | Thomson | May 20, 1930 |
| 1,853,253 | Bennett | Apr. 12, 1932 |
| 2,282,704 | Butters | May 12, 1942 |
| 2,335,924 | Elholm | Dec. 7, 1943 |
| 2,357,600 | Pabst | Sept. 5, 1944 |
| 2,412,297 | Shirk et al. | Dec. 10, 1946 |
| 2,418,726 | Rogers et al. | Apr. 8, 1947 |
| 2,525,870 | Crofoot | Oct. 17, 1950 |